US006553430B1

United States Patent
Keller (10) Patent No.: US 6,553,430 B1
(45) Date of Patent: Apr. 22, 2003

(54) COMPUTER SYSTEM IMPLEMENTING FLUSH OPERATION

(75) Inventor: James B. Keller, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/410,852

(22) Filed: Oct. 1, 1999

Related U.S. Application Data (63) Continuation-in-part of application No. 09/398,624, filed on Sep. 17, 1999.
(51) Int. Cl.[7] .......................... G06F 13/16; G06F 13/18
(52) U.S. Cl. ............................... 710/5; 710/6; 710/107; 710/112; 710/141; 710/305; 710/306; 710/310; 710/311; 370/402
(58) Field of Search ................................ 710/5, 6, 305, 710/112, 306, 107, 310, 311; 711/141; 370/402

(56) References Cited

U.S. PATENT DOCUMENTS

| | | | |
|---|---|---|---|
| 5,749,095 A | | 5/1998 | Hagersten |
| 6,085,274 A | * | 7/2000 | Seeman ........................ 370/402 |
| 6,157,977 A | * | 12/2000 | Sherlock et al. ............. 370/402 |
| 6,279,087 B1 | * | 8/2001 | Melo et al. ................... 710/310 |
| 6,353,877 B1 | * | 3/2002 | Duncan et al. .............. 710/306 |
| 6,405,276 B1 | * | 6/2002 | Chen et al. .................. 710/109 |

* cited by examiner

Primary Examiner—Christopher B. Shin
Assistant Examiner—Rehana Perveen
(74) Attorney, Agent, or Firm—Lawrence J. Merkel; Meyertons, Hood, Kivlin, Kowert & Goetzel, P.C.

(57) ABSTRACT

A computer system is presented which implements a "flush" operation providing a response to a source which signifies that all posted write operations previously issued by the source have been properly ordered within their targets with respect to other pending operations. The computer system includes multiple processing nodes within a processing subsystem and at least one input/output (I/O) node coupled to a processing node including a host bridge. The host bridge receives non-coherent posted write commands from the I/O node and responsively generates corresponding coherent posted write commands within the processing subsystem. Each posted write command has a target within the processing subsystem. The host bridge includes a data buffer for storing data used to track the status of non-coherent posted write commands. The I/O node issues a flush command to ensure that all previously issued non-coherent posted write commands have at least reached points of coherency within the processing subsystem. The host bridge issues a non-coherent target done response to the I/O node in response to: (i) the flush command, and (ii) coherent target done responses received from all targets of posted write commands previously issued by the I/O node. Coherent target done responses signify write commands have at least reached points of coherency within the processing subsystem. The non-coherent target done response signals the I/O node that all non-coherent posted write commands previously issued by the I/O node have at least reached points of coherency within the processing subsystem.

21 Claims, 8 Drawing Sheets

| Bit Time | 7 | 6 | 5 | 4 | 3 | 2 | 1 | 0 |
|---|---|---|---|---|---|---|---|---|
| 1 | SeqId[3:2] | | Cmd[5:0] | | | | | |
| 2 | Pass PW | SeqId[1:0] | | UnitID[4:0] | | | | |
| 3 | Mask/Count[1:0] | | Compat | SrcTag[4:0] | | | | |
| 4 | Addr[7:2] | | | | | | Mask/Count[3:2] | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

*FIG. 5*

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | MaskCount[1:0] | | Compat | SrcTag[4:0] | | | | |
| 4 | Addr[7:2] | | | | | | Mask/Count[3:2] | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

*FIG. 6*

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | TgtNode[2:0] | | | TgtUnit[1:0] | | SrcNode[2:0] | | |
| 3 | MD | Rsv | | SrcTag[4:0] | | | | |
| 4 | Addr[7:3] | | | | | NextState[1:0] | | RD |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

*FIG. 7*

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Shared | | Rsv | | Rsv | | | |

*FIG. 8*

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Rsv | | | | Rsv | | | |

FIG. 9

| Bit Time | 7 | 6 | 5 | 4 | 3 | 2 | 1 | 0 |
|---|---|---|---|---|---|---|---|---|
| 1 | Rsv | | Cmd[5:0] | | | | | |
| 2 | Pass-PW | Bridge | Rsv | UnitID[4:0] | | | | |
| 3 | Rsv | | Error | SrcTag[4:0] | | | | |
| 4 | Rsv | | | | | | Rsv | |

FIG. 10

| Bit Time | 7 | 6 | 5 | 4 | 3 | 2 | 1 | 0 |
|---|---|---|---|---|---|---|---|---|
| 1 | SeqId[3:2] | | Cmd[5:0] | | | | | |
| 2 | Pass-PW | SeqId[1:0] | | UnitID[4:0] | | | | |
| 3 | Rsv | | | SrcTag[4:0] | | | | |
| 4 | Rsv | | | | | | | |

COMPUTER SYSTEM IMPLEMENTING FLUSH OPERATION

This patent application is a continuation-in-part of U.S. patent application Ser. No. 09/398,624 filed Sep. 17, 1999.

BACKGROUND OF THE INVENTION

1. Field of the Invention

This invention is related to the field of computer systems and, more particularly, to computer systems wherein certain write operations may be considered completed by a source upon transmission (i.e., posted write operations).

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The low signal frequencies reduce signal bandwidth, limiting the performance of devices attached to the bus.

Lack of scalability to larger numbers of devices is another disadvantage of shared bus systems. As mentioned above, the available bus bandwidth is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus. Overall performance of the computer system including the shared bus will most likely be reduced.

On the other hand, distributed memory systems lack many of the above disadvantages. A computer system with a distributed memory system includes multiple nodes, two or more of which are coupled to different memories. The nodes are coupled to one another using any suitable interconnect. For example, each node may be coupled to each other node using dedicated lines. Alternatively, each node may connect to a fixed number of other nodes, and transactions may be routed from a first node to a second node to which the first node is not directly connected via one or more intermediate nodes. A memory address space of the computer system is assigned across the memories in each node.

In general, a "node" is a device which is capable of participating in transactions upon the interconnect. For example, the interconnect may be packet based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. Alternatively, a node located on a communication path between the source and target nodes may relay the packet from the source node to the target node.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed systems, nodes may initiate transactions concurrently and use the interconnect to transmit the transactions to other nodes. These transactions may have logical conflicts between them (e.g. coherency conflicts for transactions involving the same address) and may experience resource conflicts (e.g. buffer space may not be available in.various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

For example, certain deadlock conditions may occur in Peripheral Component Interconnect (PCI) I/O systems if "posted" write operations are not allowed to become unordered with respect to other operations. Generally speaking, a posted write operation is considered complete by the source when the write command and corresponding data are transmitted by the source (e.g., by a source interface). A posted write operation is thus in effect completed at the source. As a result, the source may continue with other operations while the packet or packets of the posted write operation travel to the target and the target completes the posted write operation. The source is not directly aware of when the posted write operation is actually completed by the target.

In contrast, a "non-posted" write operation is not considered complete by the source until the target (e.g., a target interface) has completed the non-posted write operation. The target generally transmits an acknowledgement to the source when the non-posted write operation is completed. Such acknowledgements consume interconnect bandwidth and must be received and accounted for by the source. Non-posted write operations may be required when the write operations must be performed in a particular order (i.e., serialized).

When a source must accomplish multiple write operations, and the write operations need not be completed in any particular order, it is generally preferable from a system performance standpoint to accomplish the write operations as posted write operations. Situations may arise, however, where the posted write operations need to be properly ordered within their targets with respect.to other pending operations such that memory coherency is preserved within the computer system before processing operations within the source may be continued.

It would thus be desirable to have a computer system implementing a special operation which provides assurance to the source that all posted write operations previously issued by the source have been properly ordered within their targets with respect to other pending operations. The computer system may have, for example, a distributed memory system, and the special operation may help preserve memory coherency within the computer system.

SUMMARY OF THE INVENTION

A computer system is presented which implements a "flush" operation providing a response to a source which signifies that all posted write operations previously issued by the source have been properly ordered within their targets with respect to other pending operations. The flush operation helps to preserve memory coherency within the computer system.

In one embodiment, the computer system includes a processing subsystem and an input/output (I/O) node. The processing subsystem includes multiple processing nodes interconnected via coherent communication links. Each processing node includes a processor preferably executing software instructions. Each processing node may include, for example, a processor core configured to execute instructions of a predefined instruction set. One of the processing nodes includes a host bridge. The I/O node is coupled to the processing node including the host bridge via a non-coherent communication link. The I/O node may be part of an I/O subsystem including multiple I/O nodes serially interconnected via non-coherent communication links.

The processing subsystem may include, for example, a first processing node, a second processing node, and a memory coupled to the first processing node. Either the first or second processing node may include the host bridge, and the I/O node may thus be coupled to the first or second processing node. The I/O node may generate a "non-coherent" posted write command in order to store data within the memory. As defined herein, a non-coherent command is a command issued via a non-coherent communication link. The second processing node may include a cache, and the processing subsystem may be operated such that memory coherency is maintained within the memory and the cache.

When write operations need not be completed in any particular order, the I/O node may generate non-coherent posted write commands due to the performance advantage of posted write operations over non-posted write operations. The non-coherent posted write operation has a target within the processing subsystem. The target may be, for example, a processing node coupled to a memory including an address or range of addresses of the non-posted write operation. In response to a non-coherent posted write command received from the I/O node, the host bridge is configured to generate a corresponding "coherent" posted write command within the processing subsystem. As defined herein, a coherent command is a command issued via a coherent communication link. The host bridge may include translation logic for translating the non-coherent posted write command to the coherent posted write command.

The host bridge includes a data buffer for storing data used to track the status of non-coherent posted write commands received from the I/O node. The data buffer may be used to store coherent transaction data associated with the coherent posted write command and non-coherent transaction data associated with the non-coherent posted write command. The coherent transaction data may include a source tag assigned to the coherent posted write command by the host bridge, and the non-coherent transaction data may identify the transaction as a posted write command and the source of the non-coherent posted write command.

The I/O node issues a flush command to ensure that all previously issued non-coherent posted write commands have at least reached points of coherency within the processing subsystem. A point of coherency is reached with regard to a specific non-coherent posted write command when: (i) the corresponding coherent posted write command is properly ordered within the target with respect to other commands pending within the target, and (ii) a correct coherency state with respect to the coherent posted write command has been established in the other processing nodes.

The host bridge issues a non-coherent target done response to the I/O node in response to: (i) the flush command, and (ii) coherent target done responses received from all targets of coherent posted write commands resulting from non-coherent posted write commands previously issued by the I/O node. A given target may transmit a coherent target done response when the coherent posted write command has at least reached the point of coherency within the processing subsystem. The non-coherent target done response from the host bridge signals the I/O node that all non-coherent posted write commands previously issued by the I/O node have at least reached points of coherency within the processing subsystem. In response to the flush command and the coherent target done response from the target, the host bridge may use the coherent and non-coherent transaction data stored within the data buffer to issue the non-coherent target done response to the I/O node.

As described above, the I/O node may be part of an I/O subsystem including multiple I/O nodes serially interconnected via non-coherent communication links. The non-coherent posted write command may have a source within the I/O subsystem, and may be completed by the source in response to transmission of the non-coherent posted write command by the source. Posted and non-posted commands may travel in separate virtual channels in order to prevent deadlock situations within the computer system. As a result, the non-coherent posted write command may be conveyed within a posted command virtual channel of the I/O subsystem, and the posted command virtual channel may be separate from a non-posted command virtual channel of the I/O subsystem.

In one embodiment of a method for ensuring a posted write common originating within an I/O subsystem of a computer system reaches a point of coherency within a processing subsystem of the computer system, the I/O subsystem provides the posted write command to the host bridge of the processing subsystem. The host bridge translates the posted write command to a coherent posted write command, and transmits the coherent posted write command to a target within the processing subsystem. The I/O subsystem provides a flush command to the host bridge. The host bridge provides a target done response to the I/O subsystem in response to: (i) the flush command, and (ii) a target done response received from the target.

An I/O node within the I/O subsystem may be a source of the posted write command, and a processing node within the processing subsystem may be the target. The posted write command provided by the I/O subsystem to the host bridge may be a non-coherent posted write command. The posted write command provided by the I/O subsystem to the host bridge, the coherent posted write command, the flush command, the target done response received by the host bridge from the target, and the target done response provided by the host bridge to the I/O subsystem may be transmitted as one or more packets. The target done response from the target signifies that the coherent posted write command has at least reached the point of coherency within the processing subsystem. The target done response from the host bridge signals the I/O subsystem that the previous posted write command has at least reached a point of coherency within the processing subsystem.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
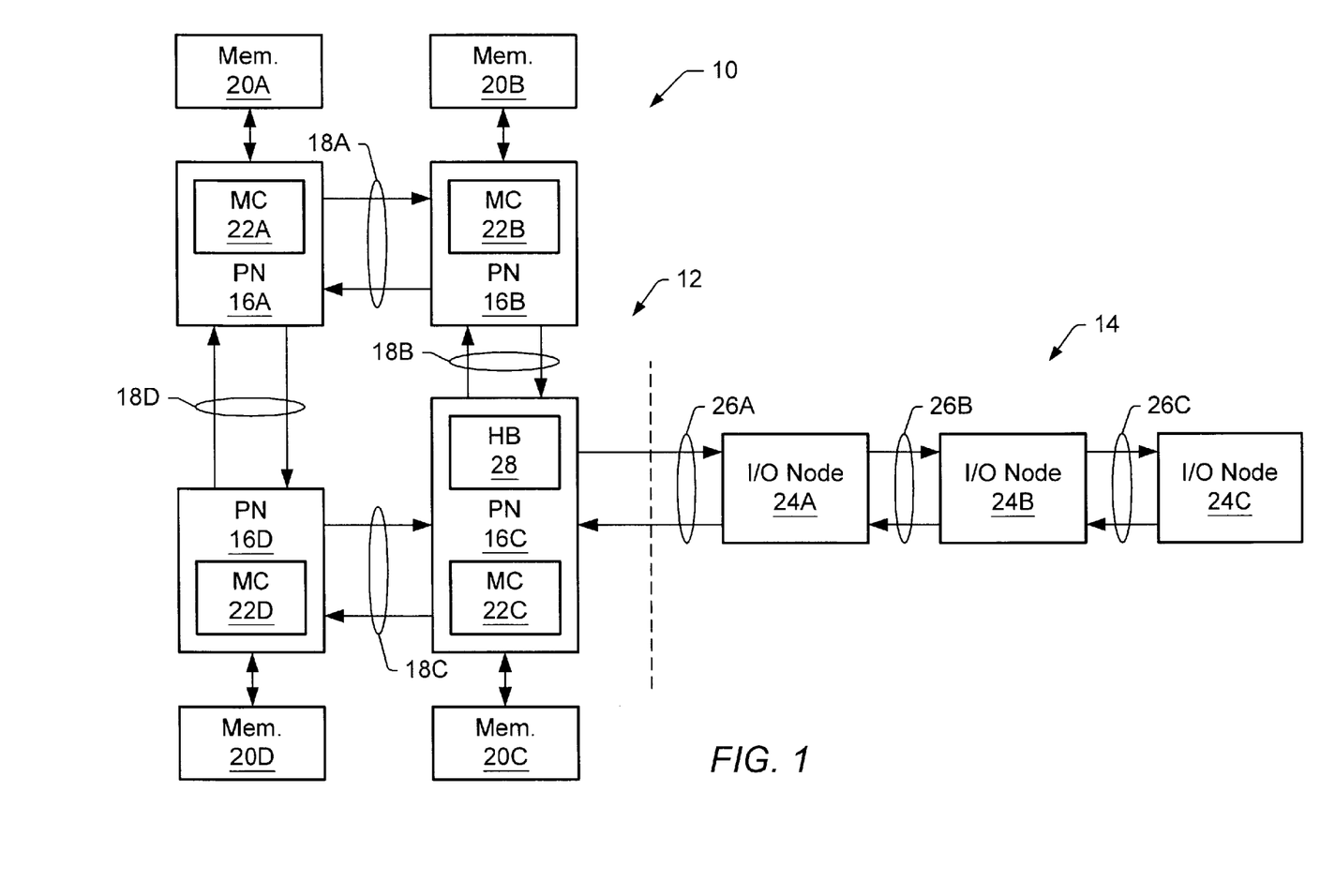
FIG. 1 is a block diagram of one embodiment of a computer system including a processing subsystem and an input/output (I/O) subsystem, wherein the processing subsystem includes several processing nodes, and wherein one of the processing nodes includes a host bridge.

FIG. 1 is a block diagram of one embodiment of a computer system 10 including a processing subsystem 12 and an input/output (I/O) subsystem 14. Other embodiments of computer system 10 are possible and contemplated. Processing subsystem 12 includes several processing nodes (PN) 16A, 16B, 16C, and 16D. Processing node 16A is coupled to processing node 16B via a bidirectional communication link 18A. Similarly, processing node 16B is coupled to processing node 16C by a bidirectional communication link 18B, processing node 16C is coupled to processing node 16D by a bidirectional communication link 18C, and processing node 16D is coupled to processing node 16A by a bidirectional communication link 18D. Processing nodes 16A–16D are thus interconnected by bidirectional communication links 18A–18D to form a ring structure. As indicated in FIG. 1 and described in more detail below, each bidirectional communication link 18 within processing subsystem 12 may include two unidirectional sets of transmission media (e.g., wires).

Each processing node 16A–16D is coupled to a respective memory 20A–20D via a memory controller (MC) 22A–22D included within each respective processing node 16A–16D. As will be described in more detail below, a memory address space of computer system I/O is assigned across memories 20A–20D such that computer system 10 has a distributed memory system.

I/O subsystem 14 includes several I/O nodes 24A, 24B, and 24C. Each I/O node 24 may embody one or more I/O functions (e.g., modem, sound card, etc.). I/O node 24A is coupled to processing node 16C via a bidirectional communication link 26A. Similarly, I/O node 24B is coupled to I/O node 24A via a bidirectional communication link 26B, and I/O node 24C is coupled to I/O node 24B via a bidirectional communication link 26C. I/O nodes 22A–22C are thus coupled one after another in series or daisy chain fashion. As indicated in FIG. 1 and described in more detail below, each bidirectional communication link 26 within I/O subsystem 14 may include two unidirectional sets of transmission media (e.g., wires).

Figure 2:
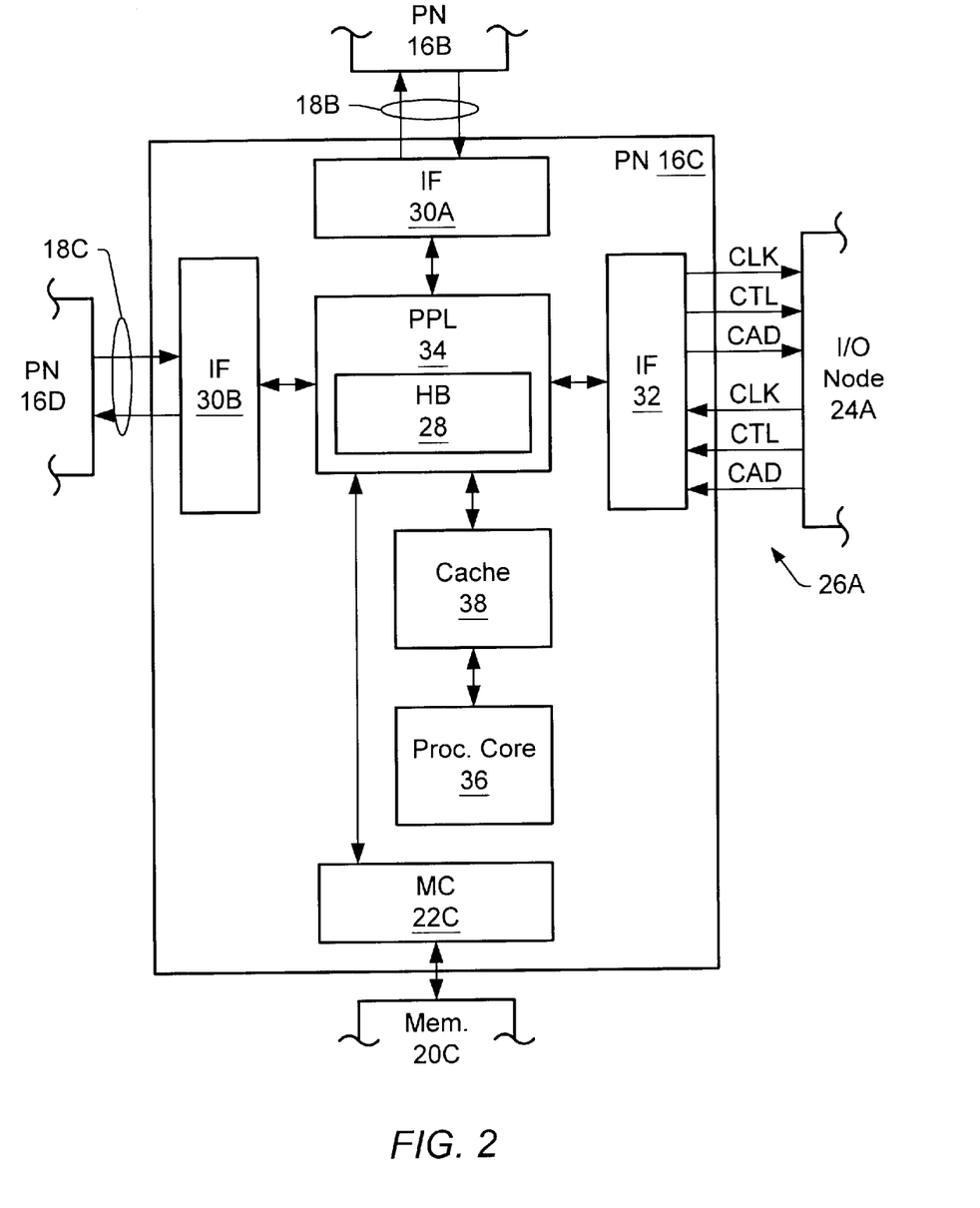
FIG. 2 is a block diagram of one embodiment of the processing node of FIG. 1 including the host bridge.

Processing node 16C includes a host bridge 28 forming an interface between I/O subsystem 14 and processing subsystem 12. FIG. 2 is a block diagram of one embodiment of processing node 16C of FIG. 1. In addition to memory controller 20C, processing node 16C includes a communication interface (IF) 30A coupled to link 18B, a communication interface 30B coupled to link 18C, and a communication interface 32 to link 26A. Processing node 16C communicates with processing nodes 16B and 16D via respective interfaces 30A and 30B, and communicates with I/O node 24A via interface 32. Packet processing logic (PPL) 34 includes host bridge 28, and is coupled to interfaces 30A, 30B, and 32, and to memory controller 22C. Processing node 16C also includes a processor core 36 coupled to a cache memory 38. Cache 38 is coupled to packet processing logic 34.

Processor core 36 preferably includes circuitry for executing instructions according to a predefined instruction set. For example, the x86 instruction set architecture may be selected. Alternatively, the Alpha, PowerPC, or any other instruction set architecture may be selected. Generally, processor core 36 accesses cache 38 for instructions and data. If needed instructions and/or data is not present within cache 38 (i.e., a cache miss is detected), a read request is generated and transmitted to the memory controller within the processing node to which the missing cache block is mapped.

Each processing node 16 in FIG. 1 may include a processor core similar to processor core 36, a cache similar to cache 38, packet processing logic similar to packet processing logic 34 (minus host bridge 28), and interfaces similar to interfaces 30. Alternately, each processing node 16 may include packet processing logic 34 with host bridge 28, and host bridge 28 in processing nodes 16A, 16B, and 16D may be idle.

Memories 20A–20D in FIG. 1 may include any suitable memory devices. For example, each memory 20 may include one or more RAMBUS DRAMs (RDRAMs), synchronous DRAMs (SDRAMs), static RAM, etc. As described above, the address space of computer system 10 is divided among memories 20A–20D. Each processing node 16A–16D may include a memory map used to determine which addresses are mapped to each of the memories 20A–20D, and hence to which processing node 16A–16D a memory request for a particular address should be routed.

Memory controllers 22A–22D coupled to respective memories 20A–20D include control circuitry for interfacing to memories 20A–20D. Memory controllers 22A–22D may include request queues for queuing memory access requests. Where multiple processing nodes 16 include caches similar to cache 38, memory controllers 22A–22D may be responsible for ensuring that memory accesses to respective memories 20A–20D occur in a cache coherent fashion.

As indicated in FIGS. 1 and 2 and described above, bidirectional communication links 18 and 26 may include two unidirectional sets of transmission media (e.g., wires). Communication link 26A in FIG. 2 includes a first set of three unidirectional transmission media directed from interface 32 to I/O node 24A, and a second set of three unidirectional transmission media directed from 10 node 24A to interface 32. Both the first and second sets include separate transmission media for a clock (CLK) signal, a control (CTL) signal, and a command/address/data (CAD) signal. In a preferred embodiment, the CLK signals serves as a clock signal for the CTL and CAD signals. A separate CLK signal may be provided for each 8-bit byte of the CAD signal. The CAD signal is used to convey control packets and data packets. Types of control packets include command packets and response packets. The CAD signal may be, for example, 8, 16, or 32 bits wide, and may thus include 8, 16, or 32 separate transmission media.

The CTL signal is asserted when the CAD signal conveys a command packet, and is deasserted when the CAD signal conveys a data packet. The CTL and CAD signals may transmit different information on the rising and falling edges of the CLK signal. Accordingly, two data units may be transmitted in each period of the CLK signal. Communication link 26A in FIG. 2 and described above is preferably typical of communication links 18 within processing subsystem 12 and communication links 26 within I/O subsystem 14.

Processing nodes 16A–16D implement a packet-based link for inter-processing node communication. Communication links 18 are used to transmit packets between processing nodes 16 within processing subsystem 12, and are operated in a "coherent" fashion such that processing subsystem 12 preserves the coherency of data stored within memories 20A–20D and the caches of processing nodes 16A–16D.

I/O nodes 24A–24C also implement a packet-based link for inter-I/O node communication. Communication links 26B and 26C are used to transmit packets between I/O nodes 24 within I/O subsystem 14, and communication link 26A is used to transmit packets between I/O node 24A and processing node 16C. Communication links 26A–26C are operated in a "non-coherent" fashion as system memory is not distributed within I/O subsystem 14.

Interface logic used within computer system 10 (e.g., interface logic 30A–30B and 32) may include buffers for receiving packets from a communication link and for buffering packets to be transmitted upon the communication link. Computer system 10 may employ any suitable flow control mechanism for transmitting packets. For example, interface logic within each node may store a count of the number of each type of buffer within interface logic of a receiver node at the other end of a communication link. A sending node may not transmit a packet unless the receiving node has a free buffer of the correct type for storing the packet. As each buffer is freed within the receiving node (e.g., by forwarding a stored packet), the receiving node transmits a message to the sending node indicating that the buffer has been freed. Such a mechanism may be referred to as a "coupon-based" system.

A packet transmitted within computer system 10 may pass through one or more intermediate processing and/or I/O nodes. For example, a packet transmitted by processing node 16A to processing node 16C within processing subsystem 12 may pass through either processing node 16B or processing node 16D. (See FIG. 1.) Any suitable packet touting algorithm may be used within processing subsystem 12. Packets transmitted within I/O subsystem 14 are either transmitted in a direction toward processing node 16C (i.e., "upstream") or in a direction away from processing node 16C (i.e., "downstream"), and may pass through one or more intermediate I/O nodes 24. For example, a packet transmitted by I/O node 24C to I/O node 24A passes through I/O node 24B. Other embodiments of computer system 10 may include more or fewer processing nodes 16 and/or I/O nodes 24 than the embodiment of FIG. 1.

The coherent packets used within processing subsystem 12 and the non-coherent packets used in I/O system 14 may have different formats, and may include different data. As will be described in more detail below, host bridge 28 within processing node 16C translates packets moving from one subsystem to the other. For example, a non-coherent packet transmitted by I/O node 24B and having a target within processing node 16A passes through I/O node 24A to processing node 16C. Host bridge 28 within processing node 16C translates the non-coherent packet to a corresponding coherent packet. Processing node 16C may transmit the coherent packet to either processing node 16B or processing node 16D. If processing node 16C transmits the coherent packet to processing node 16B, processing node 16B may receive the packet, then forward the packet to processing node 16A. On the other hand, if processing node 16C transmits the coherent packet to processing node 16D, processing node 16D may receive the packet, then forward the packet to processing node 16A.

Figure 3:
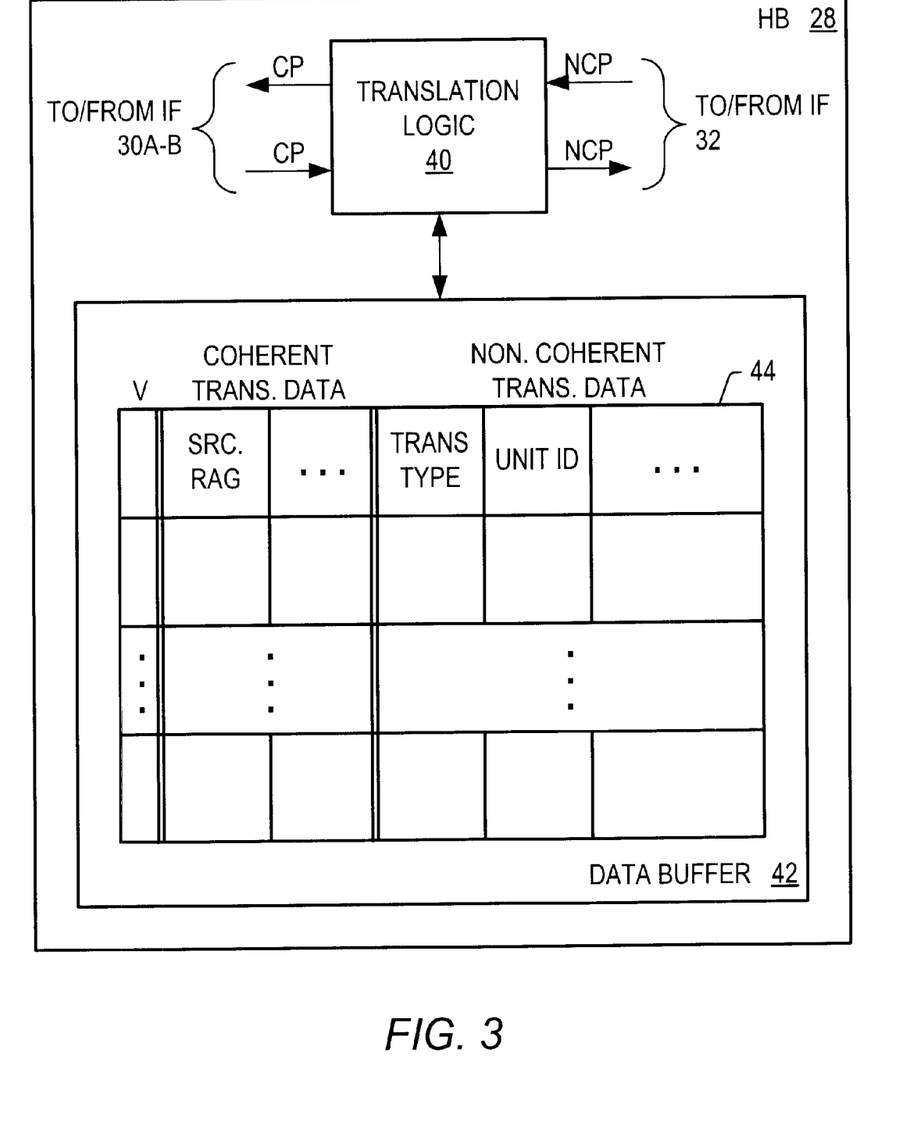
FIG. 3 is a diagram of one embodiment of the host bridge of FIGS. 1 and 2, wherein the host bridge includes translation logic coupled to a data buffer.

FIG. 3 is a diagram of one embodiment of host bridge 28 of FIGS. 1 and 2. In the embodiment of FIG. 3, host bridge 28 includes translation logic 40 coupled to a data buffer 42. Translation logic 40 translates non-coherent packets (NCPs), sourced within I/O subsystem 14 and having a target within processing subsystem 12, to corresponding coherent packets (CPs). Translation logic 40 also translates coherent packets, sourced within processing subsystem 12 and having a target within I/O subsystem 14, to corresponding non-coherent packets. Translation logic 40 may store coherent and/or non-coherent data associated with transactions sourced in one subsystem and having a target in the other subsystem within data buffer 42.

Data buffer 42 may store the transaction data in the form of a table 44 having multiple entries. Each entry may include a valid bit V, a SOURCE TAG field in a portion of table 44 associated with coherent transaction data, and a TRANSACTION TYPE and UNIT ID fields in a portion of table 44 associated with non-coherent transaction data. Valid bit V may indicate whether the corresponding entry is valid. For example, valid bit V may have a value of "1" if the corresponding entry is valid, and may have a value of "0" if the corresponding entry is invalid. The SOURCE TAG field may be used to store a source tag of processing node 16C assigned by host bridge 28 to the coherent transaction. The TRANSACTION TYPE field may contain a value indicating the type of transaction. The UNIT ID field may contain a value identifying an I/O node source of the transaction. As indicated in FIG. 3, other information may be stored within table 44.

Figure 4:
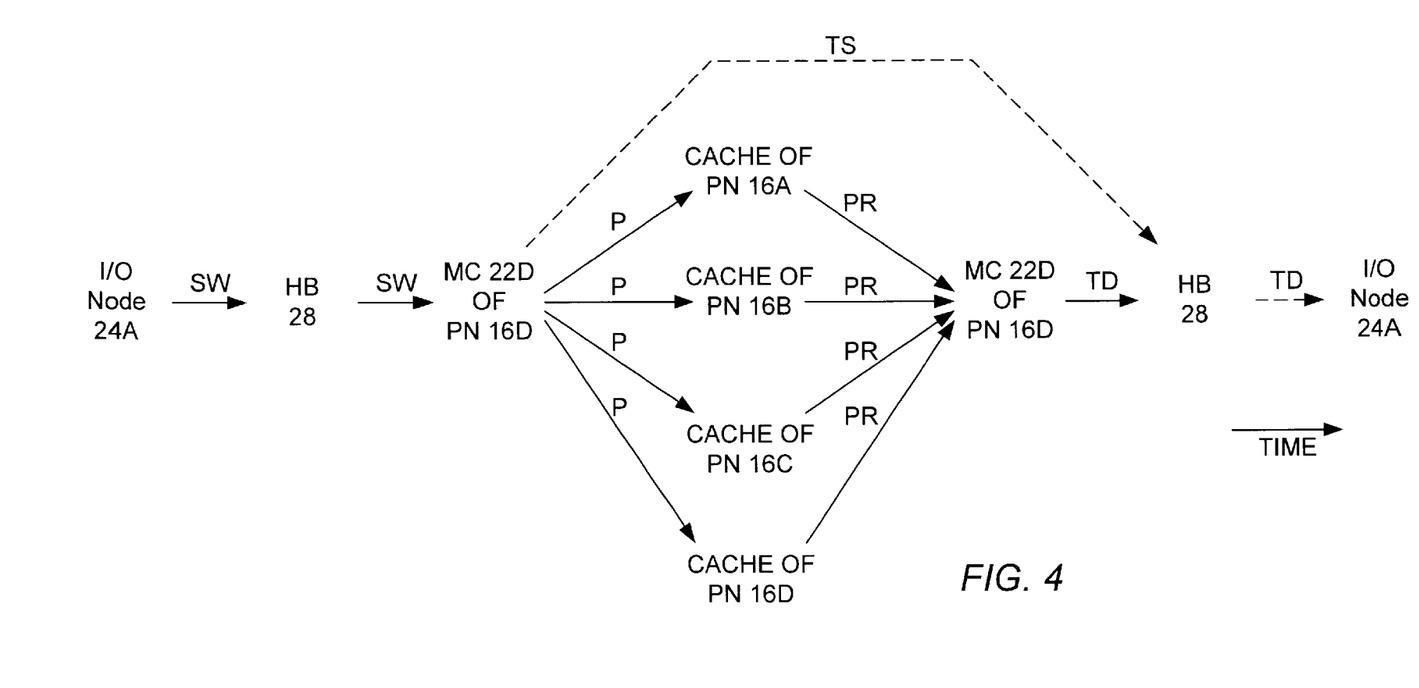
FIG. 4 is a diagram illustrating the events associated with an exemplary write transaction issued by an I/O node of the I/O subsystem as a function of time.

FIGS. 4–11 will now be used to describe events associated with an exemplary write transaction sourced by I/O node 24A and directed to a memory location within memory 20D. (See FIG. 1.) The write transaction may be a posted write transaction or a non-posted write transaction. In this example, it will be assumed that processing nodes 16A–16D include caches similar to cache 38 as described above. FIG. 4 is a diagram illustrating the events associated with the exemplary write transaction as a function of time.

Figure 5:
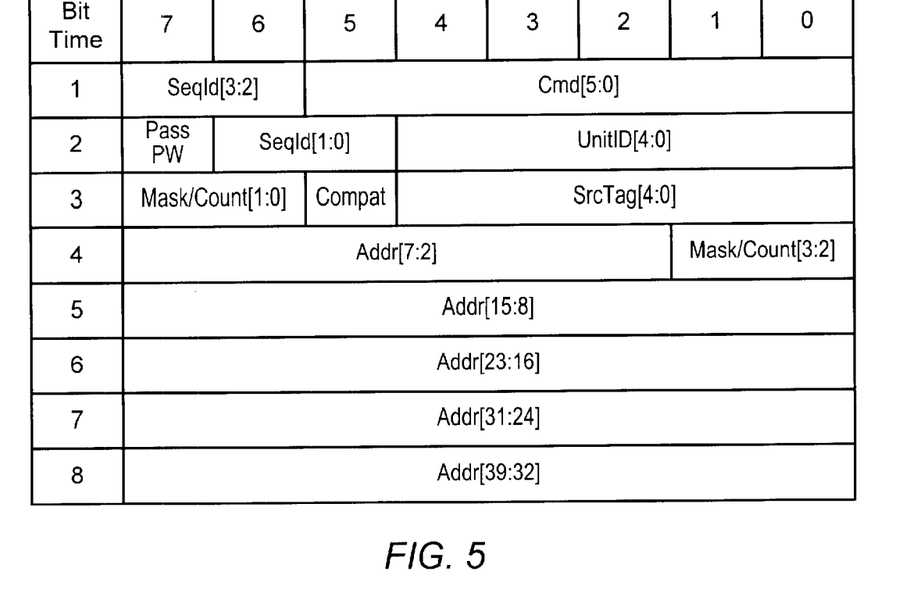
FIG. 5 is a diagram of an exemplary non-coherent sized write command packet format.

The write transaction includes a write command packet followed by one or more data packets including the data to be stored within memory 20D. I/O node 24A produces the write command packet as a non-coherent sized write (SW) command packet. FIG. 5 is a diagram of an exemplary non-coherent sized write command packet format. The packet format of FIG. 5 shows the contents of bits 7–0 of bytes transmitted in parallel during 8 consecutive "bit times". The amount of time used to transmit each data unit of a packet (e.g., byte) is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal.

The non-coherent sized write command packet of FIG. 5 includes a field Cmd[5:0], a unit ID field UnitID[4:0], and an address field Addr[39:2]. The command field Cmd[5:0] defines the packet type. For example, Cmd[5:0] contents of x01xxx may identify the command as a write command. Bit [5] of Cmd[5:0] may determine if the write command is posted or non-posted. For example, when Cmd[5:0] contains 001xxx, the command packet may be a non-posted write command packet, and when Cmd[5:0] contains 01xxx, the command packet may be a posted write command packet.

The unit ID field UnitID[4:0] serves to identify participants in a transaction. All I/O nodes transmit packets upstream toward host bridge 28, and the contents of UnitID[4:0] identifies the source node. Host bridge 28 transmits packets downstream, and the contents of UnitID[4:0] identifies the destination node. The value zero is reserved for the UnitID of the host bridge, and the value 31 is reserved and may not be used by any device. It is noted that a given I/O node may include multiple functional units each having a different UnitID. Thus multiple UnitIDs may be associated with a single I/O node. Addr[39:2] identifies the address accessed by the write command.

The non-coherent sized write command packet of FIG. 5 also includes a sequence ID field SeqID[3:0], a PassPW bit, a mask/count field Mask/Count[3:0], a compatibility bit Compat, and a source tag/reserved field SrcTag[4:0]. The sequence ID field SeqID[3:0] is used to tag groups of requests which were issued as part of an ordered sequence by a device. The PassPW bit indicates whether the packet is allowed to pass other packets in a posted request virtual channel in the same I/O stream. The mask/count field Mask/Count[3:0] either indicates which bytes within a data unit (e.g., 32-bit doubleword) are to be read (mask), or encodes the number of data units to be transferred (count). The compatibility bit Compat is a routing bit used with legacy hardware. The source tag/reserved field SrcTag[4:0] is a transaction tag assigned by the source and used to uniquely identify the transaction.

I/O node 24A transmits the packets of the write transaction upstream to processing node 16C via non-coherent communication link 26A. Interface 32 of processing node 16C receives the packets of the write transaction and provides the information contained within the packets of the write transaction to packet processing logic 34. Host bridge 28 within packet processing logic 34 uses the address of the memory location and a mapping of the memory address space of computer system 10 to determine that processing node 16D is the target.

Figure 6:
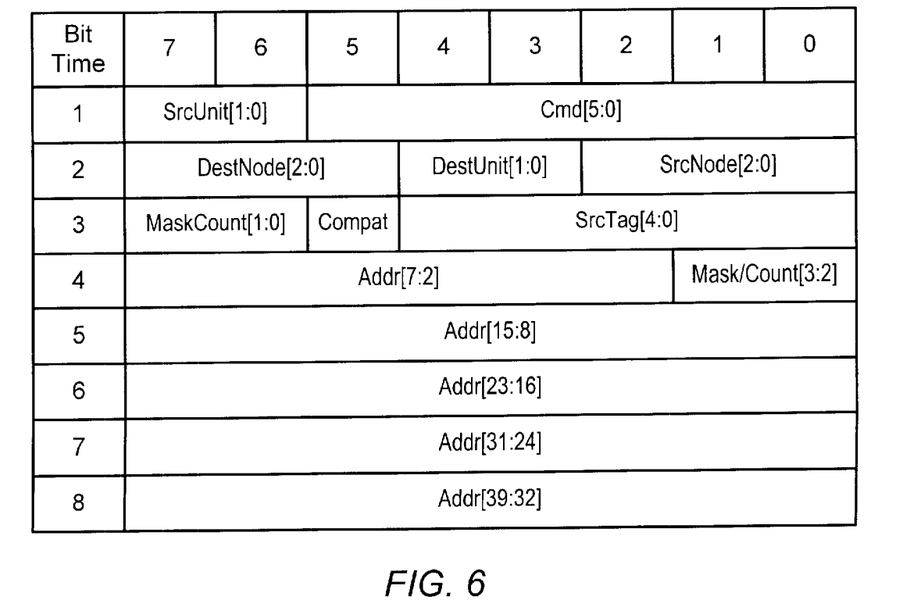
FIG. 6 is a diagram of an exemplary coherent sized write command packet format.

Host bridge 28 translates the non-coherent sized write command packet to a coherent sized write command packet identifying processing node 16D as the target. If necessary, host bridge 28 may also translate the non-coherent data packets to coherent data packets. FIG. 6 is a diagram of an exemplary coherent sized write command packet format. The coherent sized write command packet of FIG. 6 includes a command field Cmd[5:0], a destination node field DestNode[2:0], a destination unit field DestUnit[1:0], a source node field SrcNode[2:0], a source tag field SrcTag[4:0], and an address field Addr[39:2]. The command field Cmd[5:0] identifies the packet type. Cmd[5:0] contents of x01xxx may identify the command as a write command. Bit [5] of Cmd[5:0] may determine if the write command is posted or non-posted as described above.

The destination node field DestNode[2:0] identifies the target node to which the packet should be routed, and the destination unit field DestUnit[1:0] identifies the unit within the destination node to receive the packet. The source node field SrcNode[2:0] identifies the source node for the transaction. The source tag field SrcTag[4:0] is a transaction tag which, in conjunction with SrcNode[2:0], uniquely identifies the transaction. Each processing node within processing subsystem 12 may have a maximum of $2^5$ or 32 transactions in progress at any given time. Addr[39:2] identifies the address accessed by the command.

The coherent sized write command packet of FIG. 6 also includes a source unit field SrcUnit[1:0], a mask/count field Mask/Count[3:0], and a compatibility bit Compat. The source unit field SrcUnit[1:0] identifies the originating unit within the source node. The mask/count field Mask/Count[3:0] and the compatibility bit Compat are defined above.

Translation logic 40 of host bridge 28 generates the coherent sized write (i.e., write) command packet with the contents of DestNode[2:0] identifying processing node 16D as the target (e.g., a NodeID of processing node 16D), the contents of SrcNode[2:0] identifying processing node 16C as the source of the coherent write transaction (e.g., a NodeID of processing node 16C), and the contents of SrcTag[4:0] being a source tag of processing node 16C assigned to host bridge 28.

Translation logic 40 also stores coherent and non-coherent data associated with the write transaction within data buffer 42. Translation logic 40 may use the contents of Cmd[5:0] to determine the type of transaction, and may assign a corresponding value to a TRANSACTION TYPE identifier. It is noted that translation logic 40 distinguishes between posted and non-posted write transactions, and assigns different values to the TRANSACTION TYPE identifier in each case. Translation logic 40 may provide the contents of SrcTag[4:0], associated with the coherent write transaction, along with the TRANSACTION TYPE identifier and the contents of the unit ID field UnitID[4:0] of the non-coherent write command packet to data buffer 44. Data buffer 44 may store the contents of SrcTag[4:0] within the SOURCE TAG field of an available (e.g., invalid) entry within table 44. Data buffer 44 may store the value of the TRANSACTION TYPE identifier within the TRANSACTION TYPE field of the entry, and may store the contents of the unit ID field UnitID[4:0] within the UNIT ID field of the entry. Data buffer 44 may also set valid bit V of the entry to "1" to indicate that the entry is valid.

Packet processing logic 34 provides the packets of the write transaction (i.e., the coherent sized write command packet and the one or more coherent data packets) to interface 30B of processing node 16C. Interface 30B transmits the packets of the write transaction to processing node 16D via communication link 18C. The packet processing logic of processing node 16D uses the contents of the destination node field DestNode[2:0] and the destination unit field DestUnit [1:0] to determine that memory controller 22D is to receive the write operation, and provides the information contained within the packets of the write operation to memory controller 22D.

Memory controller 22D broadcasts probe command packets (P) to all processing nodes 16A–16D of processing subsystem 12. Memory controller 22D may optionally signal host bridge 28 that the write command is properly ordered (i.e., serialized) with respect to other pending operations within the target via a target start (TS) packet. Upon receiving a probe command packet, the packet processing logic within each processing node directs the probe command information to the cache within the processing node. If a cache receiving a probe command includes data associated with the address information of the probe command, but the data has not been modified, the cache invalidates the data and returns a probe response (PR) packet. On the other hand, if the cache includes modified data associated with the address information of the probe command, the cache returns the modified data via a read response transaction. The read response transaction includes a read response packet followed by a data packet including the modified data.

Figure 7:
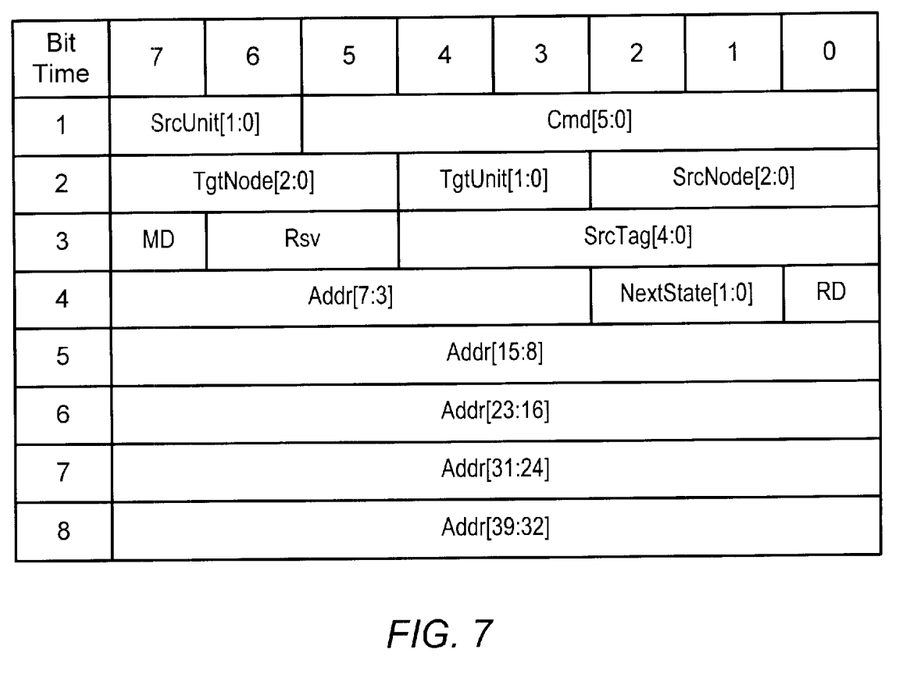
FIG. 7 is a diagram of one embodiment of a probe command packet.

FIG. 7 is a diagram of one embodiment of a probe command packet. The probe command packet of FIG. 7 includes a source unit field SrcUnit[1:0], a command field Cmd[5:0], a target node field TgtNode[3:0], a target unit field TgtUnit[1:0], a source tag field SrcTag[4:0], and an address field Addr[39:3]. The source unit field SrcUnit[1:0] contains a value identifying memory controller 22D as the source unit issuing the probe command. The command field Cmd[5:0] contains a value which identifies the packet as a probe command. The target node field TgtNode[3:0] contains a value identifying processing node 16D (e.g., the NodeID of processing node 16D) as the target for probe responses. The target unit field TgtUnit[1:0] contains a value identifing memory controller 22D as the target unit for probe responses. The contents of SrcTag[4:0] is a source tag of processing node 16D assigned by processing node 16D to the probe command. Addr[39:3] identifies the address accessed by the write command.

The probe command packet of FIG. 7 also includes a source node field SrcNode[2:0], a memory data bit MD, a field reserved for future use Rsv, a next state field NextState [1:0], and a return data bit RD. The source node field SrcNode[2:0] identifies the source node. The memory data bit MD indicates whether a read data response is required. The next state field NextState[1:0] indicates a cache state transition which should occur if the addressed data exists within the cache. The read data bit RD indicates whether data movement is required.

Figure 8:
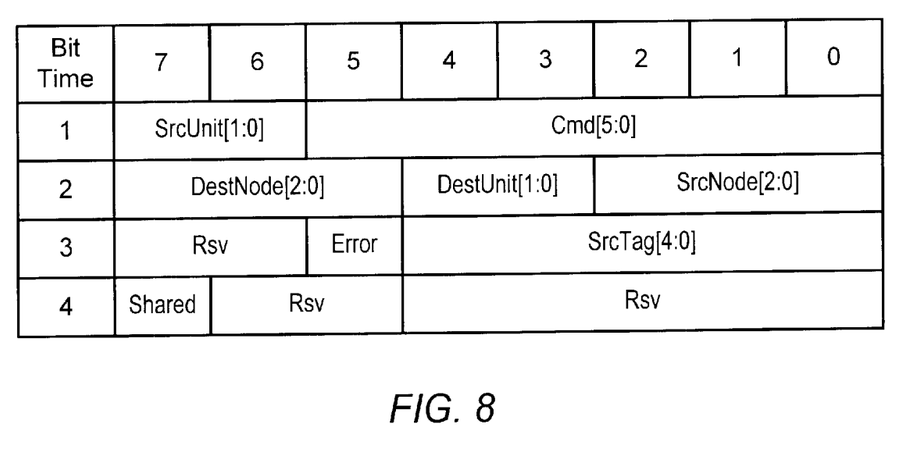
FIG. 8 is a diagram of one embodiment of a probe response packet.

FIG. 8 is a diagram of one embodiment of a probe response packet. The probe response packet of FIG. 8 includes a source unit field SrcUnit[1:0], a command field Cmd[5:0], a destination node field DestNode[2:0], a destination unit field DestUnit[1:0], a source node field SrcNode [2:0], and a source tag field SrcTag[4:0]. The source unit field SrcUnit[1:0] contains a value identifying the processing node as the source node issuing the probe response. The command field Cmd[5:0] contains a value which identifies the packet as a probe response. The target node field TgtNode[3:0] contains a value identifying processing node 16D (e.g., the NodeID of processing node 16D) as the target of the probe response packet. The target unit field TgtUnit [1:0] contains a value identifying memory controller 22D as the target unit of the probe response. The contents of SrcTag[4:0] is a source tag of the processing node issuing the probe response.

The probe response packet of FIG. 8 also includes several fields reserved for future use Rsv, an error bit Error, and a shared bit Shared. The error bit Error indicates whether the probe request resulted in an error. The shared bit Shared indicates whether the target node is maintaining a copy of the addressed data.

Memory controller 22D receives a probe response (PR) from each processing node 16A–16D. If one or more of the probe responses are read responses, memory controller 22D merges the write data with the data of the read responses. At this point, a correct coherency state with respect to the coherent posted write command has been established within the other processing nodes 16A–16C. Memory controller 22D properly orders the write operation with respect to other pending operations within memory controller 22D. When the write operation is: (i) properly ordered within memory controller 22D with respect to other commands pending within memory controller 22D, and (ii) a correct coherency state with respect to the write operation has been established in the other processing nodes 16A–16C, the write operation has reached a "point of coherency" within processing subsystem 12. Memory controller 22D then transmits a coherent target done (TD) response packet to host bridge 28.

It is noted that when memory controller 22D transmits the coherent target done response packet to host bridge 28, the write command has at least reached the point of coherency within processing subsystem 12, and the write operation may or may not have been actually completed. In other words, when memory controller 22D transmits the coherent target done response packet, the write operation has been properly ordered with respect to other pending operations, and a correct coherency state with respect to the write operation has been established in the other processing nodes. However, memory controller 22D may or may not have actually stored the data associated with the write command within memory 20D.

Figure 9:
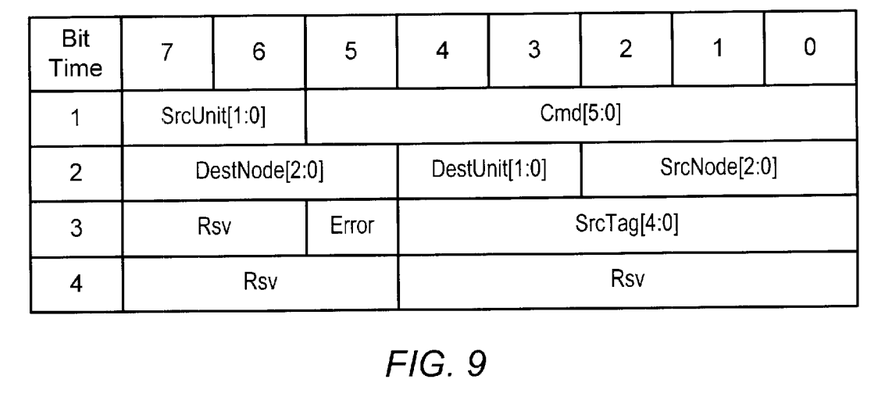
FIG. 9 is a diagram of one embodiment of a coherent target done response packet.

FIG. 9 is a diagram of one embodiment of a coherent target done response packet. The coherent target done response packet of FIG. 9 includes a source unit field SrcUnit[1:0], a command field Cmd[5:0], a destination node field DestNode[2:0], a destination unit field DestUnit[1:0], a source node field SrcNode[2:0], and a source tag field SrcTag[4:0]. The source unit field SrcUnit[1:0] contains a value identifying memory controller 22D as the source unit issuing the coherent target done response. The command field Cmd[5:0] contains a value which identifies the packet as a coherent target done response. The target node field TgtNode[3:0] contains a value identifying processing node 16C (e.g., the NodeID of processing node 16C) as the target of the coherent target done response packet. The target unit field TgtUnit[1:0] contains a value identifying host bridge 28 as the target unit of the coherent target done response. The contents of SrcTag[4:0] is the source tag originally assigned to the write operation by host bridge 28 (i.e., the source tag of the original coherent sized write command packet generated by host bridge 28). The coherent target done response packet of FIG. 9 includes several fields reserved for future use Rsv and an error bit Error which indicates whether the probe request resulted in an error.

Processing node 16D transmits the target done response packet to packet processing logic 34 of processing node 16C via communication link 18C and interface 30B. Translation logic 40 of host bridge 28 provides the contents of the source tag field SrcTag[4:0] of the target done response packet to data buffer 42. Data buffer 42 searches table 44 for a corresponding entry having a SOURCE TAG field containing a value which matches the contents of the source tag field SrcTag[4:0]. When data buffer 42 locates the corresponding entry within table 44, data buffer 42 may provide data from the non-coherent transaction data portion of the corresponding entry to translation logic 40, then invalidate the corresponding entry (e.g., by setting the valid bit V of the corresponding entry to "0").

Figure 10:
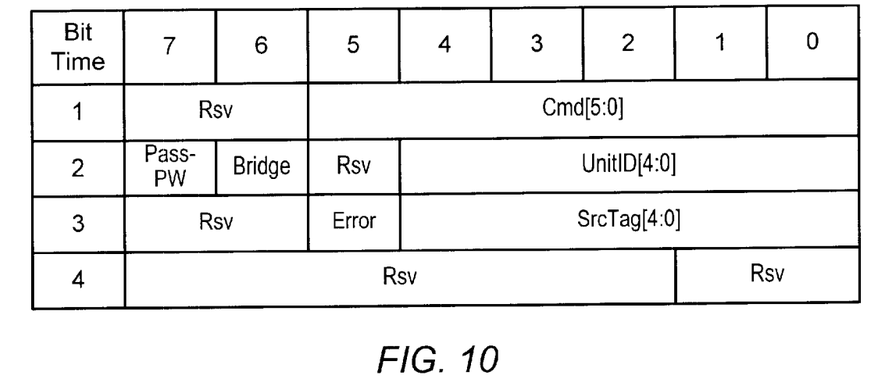
FIG. 10 is a diagram of one embodiment of a non-coherent target done response packet.

If the write command is a non-posted sized write command, host bridge 28 transmits a non-coherent target done response packet to source I/O node 24A. Host bridge may generate the non-coherent target done response packet, or may translate the coherent target done response packet received from processing node 16D to form the non-coherent target done response packet. FIG. 10 is a diagram of one embodiment of a non-coherent target done response packet. The coherent target done response packet of FIG. 10 includes a command field Cmd[5:0] and a unit ID field UnitID[4:0]. The command field Cmd[5:0] contains a value which identifies the packet as a non-coherent target done response. The unit ID field UnitID[4:0] is the value of the UNIT ID field obtained from the non-coherent transaction data portion of the corresponding entry within table 44. The coherent target done response packet of FIG. 10 also includes several fields reserved for future use Rsv, and a PassPW bit, a bridge bit Bridge, an error bit Error, and a source tag field SrcTag[4:0] defined above.

An I/O node 24 of I/O subsystem 14 (e.g., I/O node 24A) may issue one or more posted write commands in order to garner the performance advantage associated with posted write operations over non-posted write operations. Subsequently, the I/O node may transmit a "flush" command. A transaction done response received by the I/O node in response to the flush command signifies that all of the posted write operations previously issued by the I/O node have been properly ordered within their targets with respect to other pending operations such that memory coherency is preserved within computer system 10.

Figure 11:
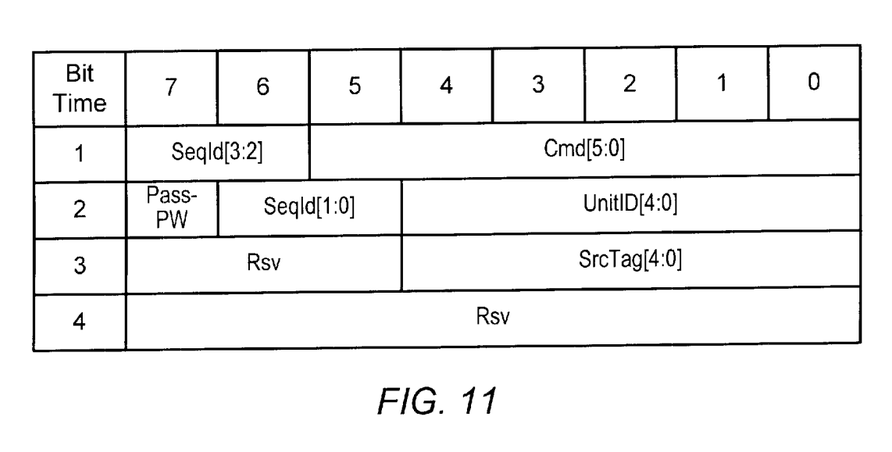
FIG. 11 is a diagram of one embodiment of a non-coherent flush command packet.

FIG. 11 is a diagram of one embodiment of a non-coherent flush command packet. The non-coherent flush command packet of FIG. 11 includes a command field Cmd[5:0], a PassPW bit, a unit ID field UnitID[4:0], and a source tag field SrcTag[4:0]. The command field Cmd[5:0] contains a value which identifies the packet as a flush command. Flush command packets are transmitted in a non-posted virtual channel, and certain other command packets including posted Write command packets are transmitted in a posted virtual channel. The PassPW bit is set to a value (e.g., "0") which indicates that command packets in the posted virtual channel and received ahead of the flush command packet must be acted upon ahead of the flush command. The unit ID field UnitID[4:0] contains a value associated with the source I/O node (e.g., the UnitID of the source I/O node). The source tag field SrcTag[4:0] is a transaction tag assigned by the source I/O node. The non-coherent flush command packet of FIG. 11 also includes a sequence Id field SeqID[3:0] defined above and several fields reserved for future use Rsv.

Figure 12:
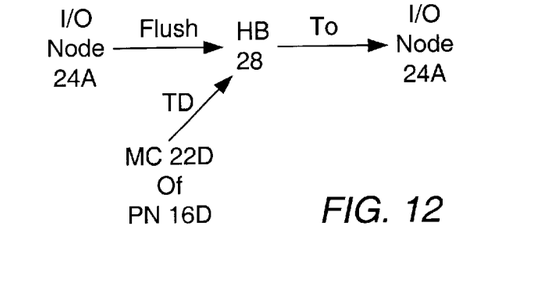
FIG. 12 is a diagram illustrating the events associated with an exemplary flush command issued by the I/O node of the I/O subsystem as a function of time.

FIG. 12 is a diagram illustrating the events associated with an exemplary flush command issued by I/O node 24A as a function of time. The flush command follows a posted write transaction sourced by I/O node 24A and storing data within memory 20D. The posted write transaction has not yet reached a point of coherency. As indicated in FIG. 12, I/O node 24A transmits a non-coherent flush command packet to host bridge. 28 as described above. The unit ID field UnitID[4:0] of the non-coherent flush command packet contains a value associated with source I/O node 24A (e.g., the UnitID of I/O node 24A). Translation logic 40 of host bridge 28 provides the contents of the unit ID field UnitID [4:0] of the non-coherent flush command packet to data buffer 42. Data buffer 42 searches valid entries of table 44 for a UNIT ID field containing a value which matches the contents of the unit ID field UnitID[4:0].

For clarity, valid entries of table 44 having a UNIT ID field containing a value which matches the contents of the unit ID field UnitID[4:0] of the non-coherent flush command packet will be referred to as candidate entries. Data buffer 42 checks the TRANSACTION TYPE field of each candidate entry to see if the contents of the TRANSACTION TYPE field identifies the transaction as a posted write transaction. If none of the candidate entries is a posted write transaction, host bridge 28 transmits a non-coherent target done response packet to source I/O node 24A indicating that all posted write operations previously issued by I/O node 24A have at least reached a point of coherency within processing subsystem 12.

On the other hand, if at least one of the candidate entries is a posted write transaction, host bridge 28 delays transmitting the non-coherent target done response packet to source I/O node 24A. Translation logic 40 may store the non-coherent data associated with the flush command within data buffer 42. Translation logic 40 may use the contents of Cmd[5:0] to determine the packet conveys a flush command, and may assign a corresponding value to a TRANSACTION TYPE identifier. Translation logic 40 may provide the TRANSACTION TYPE identifier and the contents of the unit ID field UnitID[4:0] of the flush command packet to data buffer 44. Data buffer 44 may store the value of the TRANSACTION TYPE identifier within the TRANSACTION TYPE field of an available (e.g., invalid) entry within table 44, and the contents of the unit ID field UnitID[4:0] within the UNIT ID field of the entry. It is noted that the SOURCE TAG field of the flush command entry may contain an unknown value. Data buffer 44 may also set valid bit V of the entry to "1" to indicate that the flush command entry is valid.

In the example of FIG. 12, the posted write transaction storing data within memory 20D has not yet reached a point of coherency when I/O node 24A issues the flush command. Table 44 (FIG. 3) includes a candidate entry corresponding to this posted write transaction, and host bridge 28 therefore delays transmitting the non-coherent target done response packet to source I/O node 24A. Processing node 16D subsequently issues a coherent target done response packet to host bridge 28 when the posted write transaction storing data within memory 20D reaches a point of coherency as described above. Upon receiving the coherent target done response packet from processing node 16D, data buffer 42 searches table 44 for the entry corresponding to the posted write transaction storing data within memory 20D and invalidates the entry.

During the search of table 44 in response to the coherent target done response packet from processing node 16D, data buffer 42 may note the presence of the valid flush command entry within table 44. In response thereto, and following invalidation of the entry corresponding to the posted write transaction storing data within memory 20D, data buffer 42 may again search the valid entries of table 44 for a UNIT ID field containing a value which matches the contents of the UNIT ID field of the flush command entry. Such a search may produce another set of candidate entries. Data buffer 42 may again check the TRANSACTION TYPE field of each candidate entry to see if the contents of the TRANSACTION TYPE field identifies the transaction as a posted write transaction. If at least one of the candidate entries within table 44 is-a posted write transaction, data buffer 42 may take no further action at this time.

On the other hand, if none of the candidate entries within table 44 is a posted write transaction, data buffer 42 may provide the contents of the UNIT ID field of the flush command entry to translation logic 40 and invalidate the flush command entry within table 44. Host bridge 28 may transmit the non-coherent target done response packet to source I/O node 24A indicating that all posted write operations previously issued by I/O node 24A have at least reached a point of coherency within processing subsystem 12.

The non-coherent target done response packet transmitted by host bridge 28 serves to signal I/O node 24A that all posted write operations previously issued by I/O node 24A and having the same unit ID as the flush command have been properly ordered within their targets with respect to other pending operations such that memory coherency is preserved within computer system 10. I/O node 24A may thus continue with processing operations requiring such ordering of previously issued posted write operations.

Figure 13A:
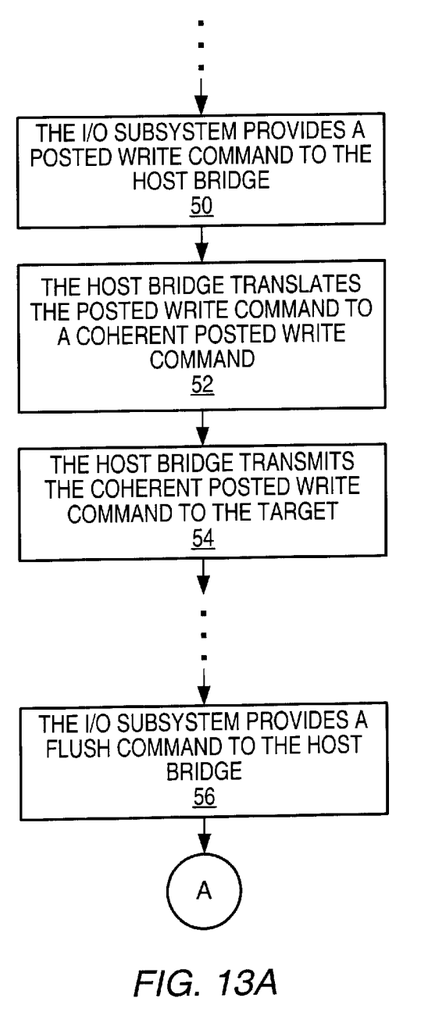
FIGS. 13A–13B constitute a flow chart of an exemplary method for ensuring a posted write command originating within the I/O subsystem reaches a point of coherency within the processing subsystem.
Figure 13B:
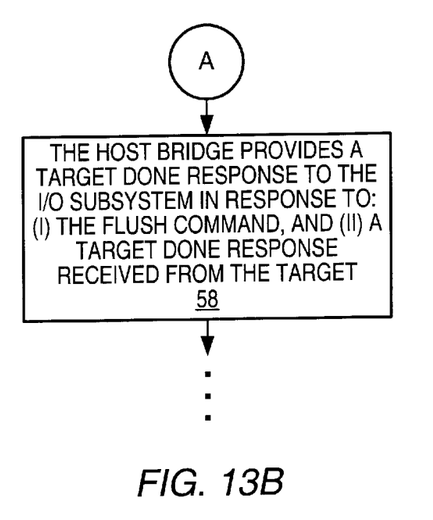

FIGS. 13A–13B constitute a flow chart of an exemplary method for ensuring a posted write command originating within I/O subsystem 14 of computer system 10 reaches a point of coherency within processing subsystem 12. As described above, an I/O node 24 within I/O subsystem 14 may be the source of the posted write command (e.g., a non-coherent posted write command). Host bridge 28 translates the posted write command to a coherent posted write command. A processing node 16 including a memory controller 22 associated with an address of the posted write command is the target of the coherent posted write command. The point of coherency is reached when: (i) the coherent posted write command is properly ordered within the target with respect to other commands pending within the target, and (ii) a correct coherency state with respect to the coherent posted write command has been established in the other processing nodes.

In the method of FIGS. 13A–13B, I/O subsystem 14 provides the posted write command to host bridge 28 during a step 50. In a step 52, host bridge 28 translates the posted write command to a coherent posted write command. Host bridge 28 transmits the coherent posted write command to the target within processing subsystem 12 during a step 54. At some later time, I/O subsystem 14 provides a flush command to host bridge 28 during a step 56. During a step 58, host bridge 28 provides a target done response to I/O subsystem 14 in response to: (i) the flush command received from I/O subsystem 14, and (ii) a target done response received from the target. As described above, the target done response from the target signifies that the coherent posted write command has at least reached the point of coherency within the processing subsystem. The target done response provided by host bridge 28 to I/O subsystem 14 signals I/O subsystem 14 that the previous posted write command has reached the point of coherency within processing subsystem 12.

FIGS. 5–11 illustrate packets formed by transmitting bytes in parallel during consecutive bit times (i.e., consecutive portions of clock signal CLK). It is noted that the packet information may be transmitted in fewer bit times by concatenating the bits of consecutive bit times and transmitting them in parallel as a single data unit. For example, the information of the non-coherent sized write command packet of FIG. 5 may be transmitted in 4 bit times by concatenating the bytes of each set of 2 consecutive bit times to form 16-bit quantities, and transmitting the 16-bit quantities in parallel during each of the 4 bit times. Similarly, the information of the non-coherent sized write command packet of FIG. 5 may be transmitted in 2 bit times by concatenating the bytes of each set of 4 consecutive bit times to form 32-bit quantities, and transmitting the 32-bit quantities in parallel during each of the 2 bit times.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a processing subsystem including a plurality of processing nodes interconnected via coherent communication links, and wherein one of the processing nodes comprises a host bridge;
   an input/output (I/O) node coupled to the processing node including the host bridge via a non-coherent communication link;
   wherein the host bridge is configured to generate a second posted write command within the processing subsystem in response to a first posted write command received from the I/O node; and
   wherein the host bridge is configured to respond to: (i) a flush command received from the I/O node, wherein the flush command is issued to ensure that previously-issued posted write commands have reached a point of coherency in the processing subsystem, and (ii) a first target done response received from within the processing system and corresponding to the second posted write transaction, by issuing a second target done response to the I/O node, the second target done response corresponding to the flush command.

2. The computer system as recited in claim 1, wherein the plurality of processing nodes comprises a first processing node and a second processing node, and wherein the processing subsystem further comprises a memory coupled to the first processing node, and wherein the I/O node is configured to generate the first posted write command in order to store data within the memory.

3. The computer system as recited in claim 2, wherein the second processing node comprises a cache, and wherein the processing subsystem operably preserves memory coherency within the memory and the cache.

4. The computer system as recited in claim 1, wherein the I/O node is part of an I/O subsystem comprising a plurality of I/O nodes serially interconnected via non-coherent communication links.

5. The computer system as recited in claim 4, wherein the first posted write command has a source within the I/O subsystem, and wherein the first posted write command is completed by the source in response to transmission of the first posted write command by the source.

6. The computer system as recited in claim 1, wherein the first posted write command has a target within the processing subsystem, and wherein the point of coherency is reached when the second posted write command is: (i) ordered within the target with respect to other commands pending within the target, and (ii) a coherency state with respect to the second posted write command has been established in the other processing nodes.

7. The computer system as recited in claim 1, wherein each of the processing nodes comprises a processor core configured to execute-instructions of a predefined instruction set.

8. The computer system as recited in claim 1, wherein the host bridge comprises translation logic for translating the first posted write command to the second posted write command.

9. The computer system as recited in claim 8, wherein the host bridge further comprises a data buffer for storing transaction data associated with the first and second posted write commands.

10. The computer system as recited in claim 9, wherein the transaction data comprises: (i) a source tag assigned to the second posted write command, (ii) data identifying the transaction as a posted write command, and (iii) data identifying a source of the first posted write command.

11. The computer system as recited in claim 10, wherein the I/O node is the source of the first posted write command.

12. The computer system as recited in claim 11, wherein the data identifying a source of the first posted write command is a value extracted from the first posted write command by the host bridge.

13. The computer system as recited in claim 12, wherein the value is one of a plurality of values assigned to the I/O node.

14. A method in a computer system comprising a processing subsystem and an input/output (I/O) subsystem, the method comprising:
the I/O subsystem providing a first posted write command to a host bridge of the processing subsystem;
the host bridge translating the first posted write command to a second posted write command;
the host bridge transmitting the second posted write command to a target within the processing subsystem;
the I/O subsystem providing a flush command to the host bridge, wherein the flush command is issued to ensure that previously-issued posted write commands have reached a point of coherency in the processing subsystem; and
the host bridge providing a target done response corresponding to the flush command to the I/O subsystem in response to: (i) the flush command, and (ii) a target done response received from the target and corresponding to the second posted write command.

15. The method as recited in claim 14, wherein the processing subsystem comprises a plurality of processing nodes, and wherein the target is one of the plurality of processing nodes, and wherein the point of coherency is reached when the second posted write command is: (i) ordered within the target with respect to other commands pending within the target, and (ii) a coherency state with respect to the second posted write command has been established in the other processing nodes.

16. The method as recited in claim 14, wherein an I/O node within the I/O subsystem is a source of the first posted write command, and wherein a processing node within the processing subsystem is the target.

17. The method as recited in claim 14, wherein the first and second posted write commands, the flush command, the target done response provided by the host bridge to the I/O subsystem, and the target done response received by the host bridge from the target are transmitted as one or more packets.

18. The method as recited in claim 14, wherein the target done response from the target signifies that the second posted write command has at least reached the point of coherency within the processing subsystem.

19. A node configured to be coupled to at least one non-coherent link and to at least one coherent link for communicating with one or more other nodes forming a processing subsystem, the node comprising a host bridge coupled to receive a flush command from the non-coherent link, wherein the flush command is issued to ensure that previously-issued posted write commands have reached a point of coherency in the processing subsystem, and wherein the host bridge is configured, responsive to the flush command and further responsive to receiving a target done response from the processing system for each posted write command previously issued by the host bridge in response to posted write commands from the non-coherent link, to generate a target done response corresponding to the flush command for transmission on the non-coherent link.

20. The node as recited in claim 19 wherein the previously issued posted write commands each have a target within the processing subsystem, and wherein the point of coherency is reached when the previously issued posted write command is: (i) ordered within the target with respect to other commands pending within the target, and (ii) a coherency state with respect to the previously issued posted write command has been established in the other nodes.

21. The node as recited in claim 19 wherein the posted write commands on the non-coherent link and the flush command each include a value identifying a source on the non-coherent link, and wherein the host bridge is configured to generate the target done response corresponding to the flush command in response to receiving target done responses for each of the previously issued posted write commands that correspond to a posted write commands having the same source as the flush command.

* * * * *